Patented Oct. 6, 1931

1,826,275

UNITED STATES PATENT OFFICE

FRANCIS CLIFFORD DYCHE-TEAGUE, OF LONDON, ENGLAND

RUBBER PRODUCT AND PRODUCTION THEREOF

No Drawing. Application filed January 18, 1929, Serial No. 333,529, and in Great Britain September 13, 1927.

The invention is an improvement in the process and the product produced thereby described in the specification of my co-pending application Serial No. 251,470 according to which a chlorinated rubber composition of low viscosity is produced which has many useful applications in the arts, the composition being stable under ordinary atmospheric conditions, unaffected by strong acids and alkalies and distinguished by giving solutions of low viscosity, for instance, a 20 to 30% solution of the product in benzene being approximately the same viscosity as raw linseed oil.

According to the present invention rubber either as an alternative to, or in addition to, the milling or mechanical disaggregation or breaking down operation mentioned in the aforesaid specification, is oxidized.

Various methods of oxidizing the rubber may be adopted, according to the kind of rubber to be treated.

When the rubber is treated with oxygen or oxidized it becomes sticky and somewhat darkened in colour and if the oxidized rubber be milled and then dissolved in a suitable solvent, it results in a solution of very low viscosity, the reduction in viscosity depending to a certain extent on the degree of oxidation.

The amount of oxygen taken up by the rubber is not great and generally need not exceed 1% by weight.

When thin sheet rubber, i. e. crepe rubber, is to be used, a convenient method of oxidizing is to expose the sheets to air or oxygen at a temperature of 60° C. or more, the rapidity of oxidation depending on the temperature, or the sheets may be exposed to ozone at ordinary temperatures.

In treating rubber solution the oxygen or ozone may be bubbled through it.

The oxidation may be effected by means of chemicals, as for example by the addition of benzoyl peroxide to a solution of rubber.

As an example, 11 parts by weight of rubber oxidized according to any of the above methods and preferably milled is dissolved in 89 parts by weight of benzene. This solution is then chlorinated.

The required degree of chlorination may be effected by passing chlorine gas into the solution until it changes from a dark colour, which it first assumes, to a pale yellow colour, it being unnecessary to prevent the heating of the solution which takes place during chlorination in this manner.

The vessel in which the chlorination is effected should be made of material, such as stoneware, which is unaffected by chlorine or hydrochloric acid.

Alternatively, the progress of the chlorination step in the process may be observed by noting the quantity of chlorine allowed to pass into the solution, and also by the type of film obtained by a "test drop".

On completion of the chlorination the chlorinated product is distilled to drive off the solvent together with the hydrochloric acid formed, the solvent being recovered in any suitable manner.

Distillation is conveniently carried out in vacuo.

The solution may be concentrated by distillation to any desired degree, and on completion of the distillation step in the process, the product is ready for use.

When the invention is carried out according to the example above set forth, the final product usually weighs 2¼ to 2½ times the weight of the rubber originally used.

It can be used for many purposes in manufactures, for example, it can be moulded under heat and pressure with or without the use of suitable fillers, or it can be used as a paint or lacquer in which case it is thinned in an appropriate solvent or solvents, such as benzene or its homologues, pigment being added if required to impart the desired colour. Other lacquer constituents such as gums may also be added.

A paint or lacquer so formed can be easily spread by means of a brush and presents an excellent surface which, when dry, is hard, waterproof and fire-resistant.

The viscosity of the solutions of the chlorinated product obtained depends on and is in direct relationship to the viscosity of the disaggregated rubber solution used.

The chlorine content of the fully chlorinated disaggregated rubber lies between 50 and 60 per cent.

Instead of using benzene as a solvent for the oxidized rubber, chlorinated hydrocarbons, such as carbon-tetrachloride, tetrachlorethane, can be used. These solvents have the advantage that they are not so readily attacked by chlorine.

I claim:—

1. A process for the production of a chlorinated rubber product consisting in oxidizing the rubber and passing chlorine through a solution of said oxidized rubber.

2. A process for the production of a chlorinated rubber product consisting in oxidizing rubber, disaggregating the oxidized product by rolling in a mill, making a solution of the disaggregated product, and passing chlorine through said solution.

In testimony whereof I have signed my name to this specification.

FRANCIS CLIFFORD DYCHE-TEAGUE.